United States Patent [19]

Silverwater et al.

[11] 4,172,971
[45] Oct. 30, 1979

[54] MAGNETIC PRESSURE INDICATOR WITH THERMAL LOCKOUT

[75] Inventors: Bernard F. Silverwater, Plainview, N.Y.; Charles Grimm, Palm Harbor, Fla.

[73] Assignee: Pall Corporation, Glen Cove, N.Y.

[21] Appl. No.: 956,291

[22] Filed: Oct. 30, 1978

[51] Int. Cl.² ............................................. G01L 9/14
[52] U.S. Cl. ................... 200/82 E; 116/220;
116/221; 116/267; 116/268; 200/82 C; 210/90
[58] Field of Search ....... 116/267, 268, 272, DIG. 42, 116/216, 221, 220; 210/90; 200/81.9 M, 82 E, 82 C

[56] References Cited

U.S. PATENT DOCUMENTS

| 2,942,572 | 6/1960 | Pall | 116/267 |
|---|---|---|---|
| 3,077,176 | 2/1963 | Pall | 116/DIG. 42 |
| 3,077,854 | 2/1963 | Pall | 116/267 |
| 3,125,062 | 3/1964 | Raupp | 116/267 |
| 3,140,690 | 7/1964 | Siebel | 116/267 |
| 3,187,711 | 6/1965 | Campolong | 116/267 |
| 3,364,897 | 1/1968 | Mouwen | 116/267 |
| 3,785,332 | 1/1974 | Silverwater | 210/90 |
| 3,815,542 | 6/1974 | Cooper | 116/221 |
| 3,841,259 | 10/1974 | Parkinson | 116/267 |
| 4,026,153 | 5/1977 | Silverwater | 73/744 |

Primary Examiner—Charles A. Ruehl
Assistant Examiner—Denis E. Corr

[57] ABSTRACT

A magnetic differential pressure indicator is provided for detecting and indicating a pressure differential thereacross that is greater than a predetermined value in a fluid system. A thermal lockout effective even at high internal fluid pressures prevents false actuation of the magnetic indicating means at low temperatures due to increased viscosity of the system fluid.

19 Claims, 4 Drawing Figures

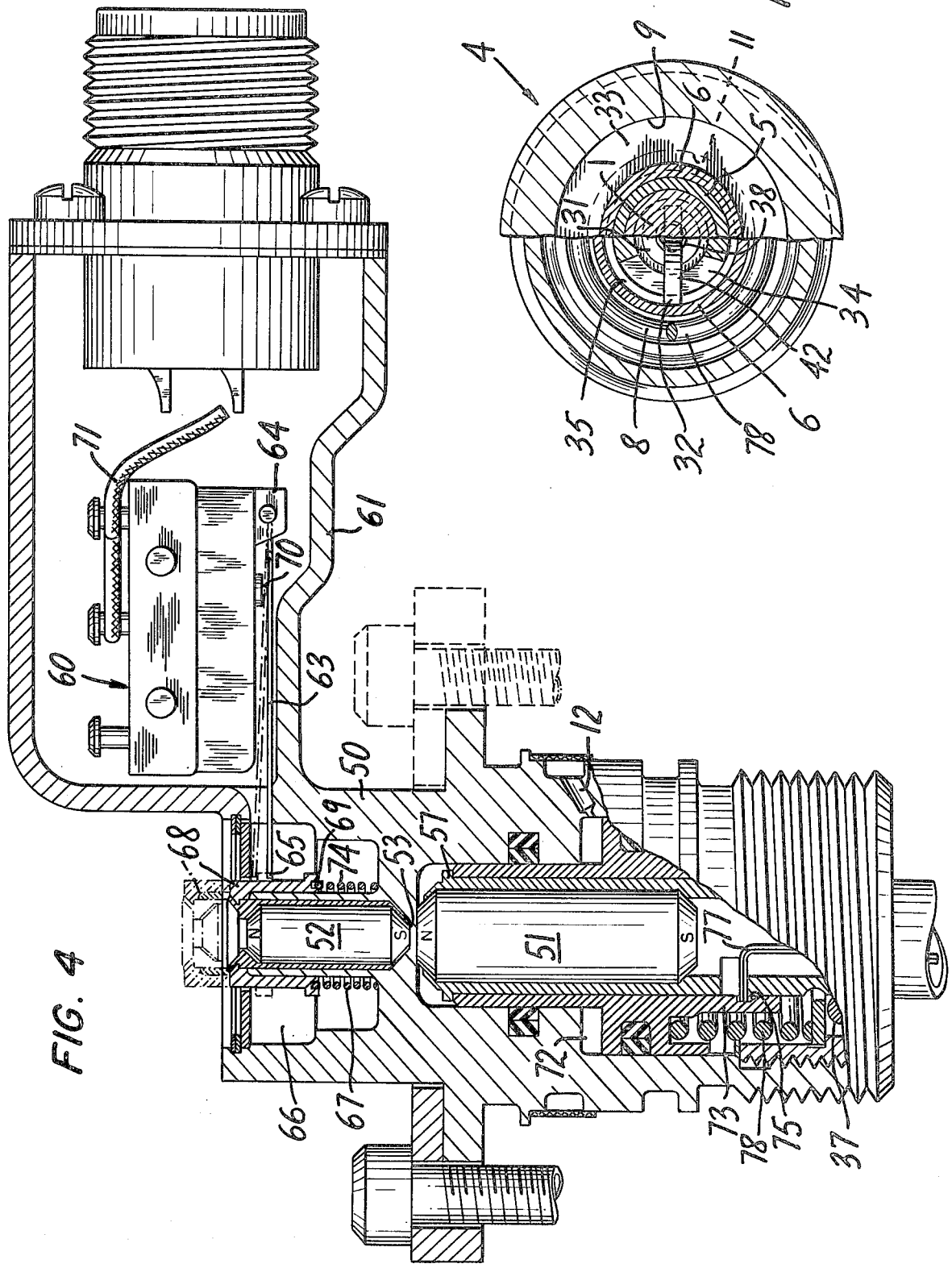

MAGNETIC PRESSURE INDICATOR WITH THERMAL LOCKOUT

In any system wherein a fluid such as hydraulic fluid or the like is passed through a filter, it is customary to provide means for indicating when the filter element has become loaded, and requires replacement. Since the pressure drop across a filter increases in proportion to the accumulation of contaminants thereon, a suitable indication can be obtained by an indicator actuated when the differential pressure across the filter reaches a predetermined value. Many types of such devices are available, in which the indicating means is actuated mechanically, or electrically, or by others means.

One simple and very successful type of indicating device is the magnetic pressure indicator of U.S. Pat. No. 2,942,572 to David B. Pall. In this device, a first magnetic means is arranged to attract a second magnetic means so long as the two means are separated by less than a predetermined distance. Bias means propels the second magnetic element to an indicating position whenever that distance is exceeded. The first magnetic means is movable with a piston responsive to changes in pressure, and is normally biased towards the second magnetic means by a predetermined force. The second magnetic means is also movable with a piston, and while retained toward the first means by magnetic attraction when close enough thereto, is normally biased in a direction away from the first means by a force capable of overcoming the force of magnetic attraction whenever the first and second means are separated by the predetermined distance. The magnitude of the force of magnetic attraction relative to the spring biasing force determines the predetermined pressure differential at which the device is actuated. Thus, the device can be arranged to be actuated at any required differential pressure, by simple adjustment of these forces.

At unusually low temperatures, the fluid in the system undergoes an increase in viscosity and the actuating pressure differential across the filter and therefore the indicator preset differential pressure can be reached and the indicator actuated due solely to viscosity increase and not high loading of the filter. To prevent such false actuation, a bimetallic element is provided that contracts and so changes its degree of curvature to move toward and grasp the side or edge of one of the magnetic means, usually the first magnetic means, to engage it at such low temperatures, and fix it against movement while such temperatures continue. When the temperature rises, the bimetallic element expands, and releases the magnetic element.

If internal fluid pressure is high, as well as the pressure differential, a considerable stress is placed on the bimetallic element when it restrains the first magnetic means. Bimetallic elements are made of two metal strips bonded together, and are inherently fragile, the bond being weaker than either metal strip, and the strips themselves to be bendable must be thin and weak. Thus, damage to the element under high pressure conditions is rather frequent. The damage cannot of course be detected unless the indicator is disassembled, which results either in false actuations being accepted as real; or in jamming of the magnetic means so that it cannot move at all, regardless of temperature. A person unaware that the bimetallic element is nonfunctional would have no way of knowing that the indicator is no longer operative, and when the system is functioning on bypass. If the system is in operation on an aeroplane during flight, the resulting danger to the aircraft is very great, and may even result in loss of the aircraft.

There are certain dificiencies in this structural design:
(1) the bimetallic element is not in direct contact with the fluid, and thus the temperature is not sensed precisely;
(2) it is difficult to incorporate a nonresettable indicator design (resettable from the inside only) with a bimetallic element that retrains the second magnetic means; and
(3) the bimetallic element is very thin and can only exert a very low mechanical restraining force. Making it thicker decreases the travel and making it longer to compensate for the increased thickness degrades its vibration resistance.

In accordance with the invention, a magnetic differential pressure indicator is provided with a means movable in response to changes in differential pressure above a predetermined minimum and linked by a bimetallic element to a reciprocable magnetic means which is itself not responsive to changes in differential pressure, so that only when so linked does the first reciprocating magnetic means move to trigger an indicating magnetic means into indicating such change in differential pressure, and a bimetallic element that at normal operating temperatures assumes a position in which it links the reciprocable magnetic means to the means responsive to differential pressure, and at abnormally low temperature moves away from such linkage and disengages the reciprocable magnetic means, and thereby prevents actuation of the indicating magnetic means. Accordingly, the bimetallic element is under no stress while the reciprocable magnetic means is inactive.

Thus, at temperatures below a predetermined low temperature, the reciprocable magnetic means and the means responsive to changes in differential pressure are decoupled, resulting in immobilizing the reciprocable magnetic means, and consequently failing to actuate the indicating magnetic means at such temperature and below. When the temperature rises to above the predetermined low temperature, the bimetallic element assumes a position linking the reciprocable magnetic means to the means responsive to changes in differential pressure, whereupon the reciprocable magnetic means is again moved in a manner to actuate the indicating magnetic means, so that it can indicate the reaching of a predetermined pressure differential.

The invention therefore overcomes the deficiencies of the prior structures, because the bimetallic element does not restrain the reciprocable magnetic means as a cantilevered beam or a column, but instead in coupling the means responsive to changes in differential pressure and the reciprocable magnetic means is placed in shear. Neither the bimetallic element nor the reciprocable magnetic means has to withstand the forces resulting from full system differential pressure thereacross. In the embodiment shown in the drawing, the only force exerted by the means responsive to differential pressure and the reciprocable magnetic means on the bimetallic element is that required to overcome the friction exerted by the detent spring as it rubs against the coupled means responsive to differential pressure and reciprocable magnetic means assembly.

The term "magnetic" as used herein encompasses both materials that are permanent magnets and materials that are attracted by magnets, whether permanently or temporarily magnetizable thereby.

The device in accordance with the invention comprises movable means movable in response to changes in differential pressure; a first reciprocable magnetic means not itself responsive to changes in differential pressure unless linked to the movable means, and spaced from and arranged to attract or repel a second indicating magnetic means or keeper so long as the two means or the first means and keeper are within their mutual magnetic fields of force, the second indicating magnetic means normally being retained in a first position; first bias means to retain the first reciprocable magnetic means towards or away from the second indicating magnetic means or keeper, and second bias means to propel the second indicating magnetic means from the first position to an indicating position whenever the spacing between the two magnetic means is changed. The first reciprocable magnetic means and the means movable in response to changes in pressure are a first piston or sleeve and are preferably concentric, one within the other, or coaxial, and the latter is normally biased toward or away from the second magnetic means or keeper by a predetermined force, so that the former is too, when linked thereto. The second magnetic means is movable with or is a second piston or ball, and is retained toward the first magnetic means or keeper by magnetic attraction, when close enough thereto, but is normally biased in a direction away from the first means or keeper by a force capable of overcoming the force of magnetic attraction to the first means or keeper whenever the first and second magnetic means or keeper are spaced by a predetermined distance.

When linked thereto, the first reciprocable magnetic means is reciprocable with the means responsive to differential pressure, but when decoupled, the former is stationary while the latter moves. If concentric, one of these components can take the form of a piston and the other a sleeve, with one within the other. The outer component has a recess in a side wall thereof, and the inner one has through a side wall thereof an aperture or passage which in the coupled position is in alignment with the recess of the outer one. The bimetallic element is mounted so that one end extends through the aperture or passage.

At normal operating temperature, the end of the bimetallic element also extends into the recess, coupling the reciprocable magnetic means and the means responsive to differential pressure for actuation of the indicating means. At start-up, or at any abnormally low temperature below a predetermined minimum, the end of the bimetallic element is retracted away from the recess, and does not project from the aperture or passage, decoupling the reciprocable magnetic means and the means responsive to differential pressure. Since only the latter responds to differential pressure, this renders the reciprocable magnetic means immobile and avoids actuation of the indicator. Since the bimetallic element is in a decoupling position at this time, it is under no stress whatsoever.

The bimetallic element is of conventional type, and is preferably comprised of two arcuate inner and outer strip portions of different metals or metal alloys having differing coefficients of thermal expansion and joined together, for example by a weld, and both arranged to change degree of curvature and thus bend outwardly or inwardly with change in temperature. At normal operating temperatures, the bimetallic element has a degree of curvature at which it links the reciprocable magnetic means and the means responsive to differential pressure. However, at temperature below a preselected value, at which for example the fluid to be filtered has an appreciably higher viscosity, for example, 33° F. to 62° F., the bimetallic element changes its degree of curvature, so that the end of the element retreats away from the recess, thus decoupling the reciprocable magnetic means, and preventing actuation of the pressure indicator.

The first and second magnetic means are each movable, i.e., reciprocable as in U.S. Pat. No. 2,942,572 (or rotatable, in the case of the second magnetic means as in U.S. Pat. No. 3,815,542 patented June 11, 1974 to Roydon B. Copper), and can be magnets or attracted to magnets. The keeper is stationary, and is positioned therebetween, spacing them by a predetermined distance at least equal to the spacing dimension of the keeper, and can be a magnet or attracted by magnets, so that one at least of the magnetic means is attracted to the keeper. The other can be attracted to the keeper or other magnetic means, or repelled by the keeper or the other magnetic means.

At least one of the two magnetic means and keeper is a magnet. Preferably, two of these elements (in any combination) are magnets, and if desired, all three can be magnets, but three are not always as advantageous as two. In addition, the keeper can be of nonmagnetic material.

If the keeper is a magnet and the first and second magnetic means are merely attracted thereto, the device functions because the first magnet means when it moves away from or moves towards the keeper changes the magnetic field between the keeper and the second magnetic means.

The keeper normally serves as the separating wall between the first and second magnetic means, and prevents fluid communication between the spaces within which the first and second magnetic means move. The keeper can be a piece fitted between these spaces, or an integral part of the housing defining such spaces. If the spaces are bores, usually coaxial, the keeper can close off and separate the two parts of the bore from each other, and define a pair of blind bores within which the two magnetic means move.

The first magnetic means can take any of several forms. It can, for example, be a piston, or part of a piston, as illustrated in the drawings, which can be in the form of a cylinder. It can also take the form of a piston or part of a piston of high surface area, such as a flexible disc or diaphragm, as shown and described, for instance, in U.S. Pat. No. 3,077,176, dated Feb. 12, 1963, to David B. Pall et al, or a bellows.

The second magnetic means also can be in the form of a piston, or part of a piston. It can also be in the form of a rotatable ball, as in U.S. Pat. No. 3,815,542. It can be arranged to project from the housing for indication, or to be visible through a transparent portion of the housing, for a visual indication. It also can be arranged to actuate a switch, as in U.S. Pat. No. 3,077,854 to David B. Pall, dated Feb. 19, 1963, or to move an indicator, such as a pointer, or magnetic fibers, either directly or magnetically.

The biasing means for the first and second pistons can take the form of a spring, such as a coil spring, a finger spring, a wave-form spring, a conical spring, or an annular disc spring, such as Belleville spring. The biasing means can also be a third magnet, as disclosed in U.S.

Pat. No. 3,140,690, to M. P. L. Siebel, in which case a spring can optionally be included or omitted.

The drawings illustrate preferred embodiments of the invention.

FIG. 1 is a view in longitudinal section taken through a typical pressure indicator according to the invention, in which the indicating device is in the form of a piston having a cap arranged to project from the housing within which the device is disposed, and showing the reciprocable magnetic means in sleeve form and the means responsive to differential pressure in piston form, coupled together by the bimetallic element;

FIG. 3 is a cross-sectional view taken on the line 3—3 of FIG. 1 and looking in the direction of the arrows; and FIG. 4 is a view in longitudinal section through another embodiment of the pressure indicator of FIG. 1, in which the piston indicating means is arranged to actuate a switch.

Figure 1:
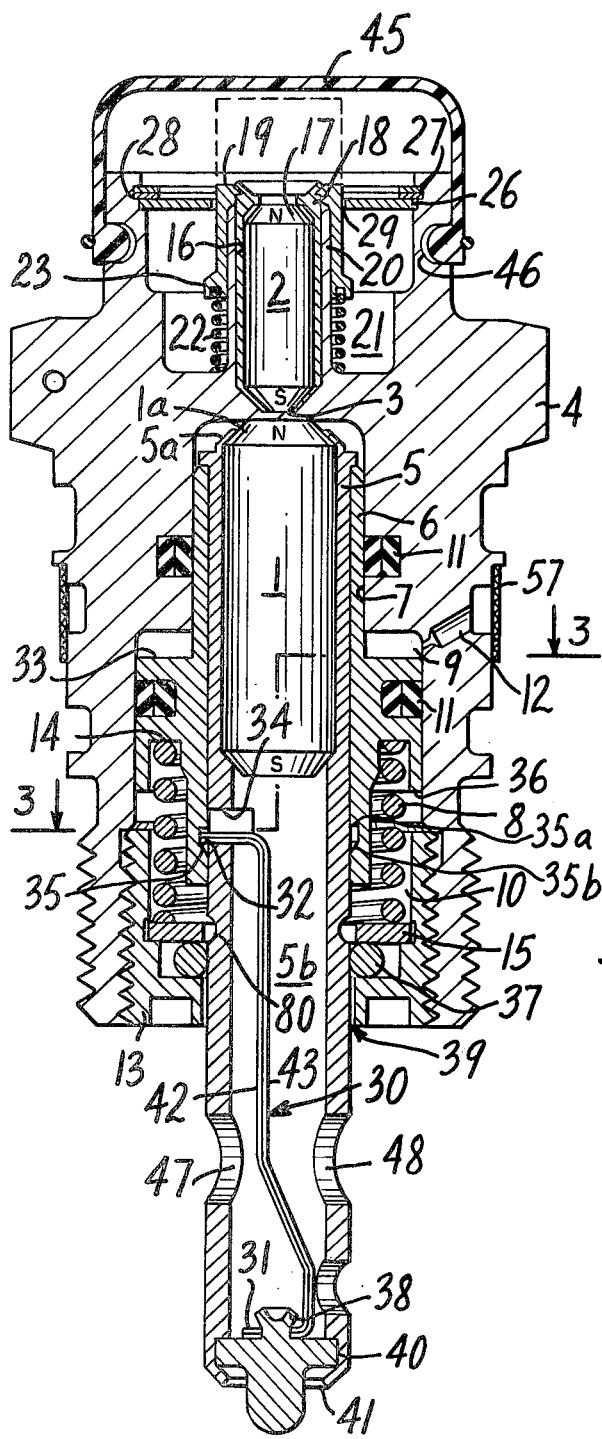
Figure 2:
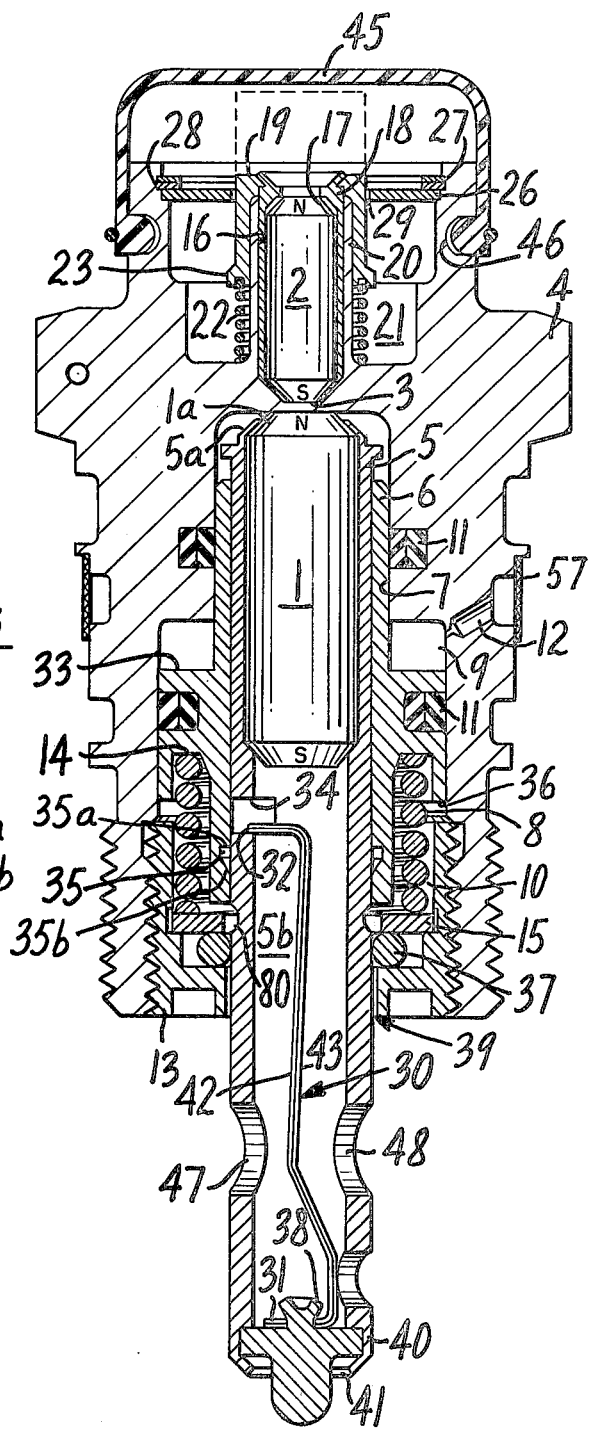
FIG. 2 is another view in longitudinal section taken through the pressure indicator of FIG. 1, and showing the bimetallic element in the decoupled position, preventing actuation of the indicator.

The pressure indicator of FIGS. 1 to 3 comprises first reciprocable magnetic element 1 and second reciprocable and indicating magnetic element 2, respectively, coaxially mounted on opposite sides of a separating wall or keeper 3 of magnetic material within a housing 4, which may be either of magnetic or nonmagnetic material. Elements 1 and 2 are positioned adjacent the wall or keeper 3, with magnetic poles opposed, so that each is drawn toward the wall by the resulting force of magnetic attraction therebetween. Preferably, the magnetic elements 1 and 2 are composed of permanently magnetized metal, such as Alnico VI, Alnico VIII, or ceramic magnetic material, or the like. If desired, however, element 2 may be formed of a suitable magnetic material such as iron, for example. Wall 3 is formed of a suitable magnetic material such as iron, for example, but it can also be of nonmagnetic material.

Mounted in a tubular sleeve 5 concentric to and slidable within enclosing hollow piston 6, which is reciprocably supported in a cylindrical bore 7 in the housing 4, the magnetic element 1 is urged toward the wall or keeper 3 via bias means 8, which in this embodiment is a coil compression spring. The tubular sleeve 5 and magnetic element 1 can also be all in one piece, of magnetic material. In order to prevent fluid from passing from the annular chamber 9 via the bore 7 to the space 10 at the other end, and also between chamber 9 and the downstream side of piston 6, liquid-tight seals are provided between the bore 7 and the piston 6 by O-rings 11, of Teflon or other suitable gasketing material. The seal may also be effected by close tolerances between the piston and bore, and the sealing rings omitted. The coil spring 8 is selected according to the desired actuating pressure to permit the piston 6 to move away (and with it sleeve 5) from wall 3 in the bore 7 whenever the pressure in that differential area 9 of piston 6 exceeds the pressure on the low pressure side by an amount equal to the actuating differential pressure.

In this embodiment of the invention, the pressure indicator is arranged to detect the pressure drop across a pressure-influencing component, such as a filter (not shown, but illustrated in U.S. Pat. No. 2,942,572). Thus, fluid under pressure is applied to the component such as a filter via an inlet line (not shown) and emerges on the other side of the component through an outlet line (not shown). The bore 12 in the housing 4 is in fluid-flow connection with the inlet line, and communicates fluid pressure in the inlet line to the annular chamber 9 at one side of the piston 6, while the space 10 at the other end of the piston 6 is in fluid pressure communication with the outlet line via port (clearance gap) 39. The difference in pressure between the inlet and outlet lines is a measure of the pressure drop across and therefore the clogging of the filter or other pressure-influencing component, and the different pressures are thus communicated to opposite sides of the piston 6.

If desired, in order to prevent dirt carried by the incoming fluid from blocking the bore 12, and/or chamber 9, possibly obstructing movement of the piston, a suitable annular filter element 57 such as sintered stainless steel screen is inserted over the outside of the housing 4 across the bore 12.

For ease in assembling the couplable sleeve 5/piston 6 assembly, the bore 7 has its open end closed off by the cap 13, and the base of the spring 8 is retained by the cap against the abutment 14 of piston 6. The spring is removably retained in its cavity 10 by the cap 13 and the washer 15. The spring can also be retained by the housing in which the indicator is installed, in which event the cap can be omitted.

The sleeve 5 has the magnetic element 1 press-fitted in one end, and retained there by turning in the sides 5a against the shoulder 1a of the magnetic element. Below the magnetic element in the open space 5b of the sleeve 5 is disposed a conventional bimetallic element 30. Two ports 47,48 expose the space 5b to downstream fluid pressure, and the space 5b is liquid-full, bathing the bimetallic element 30 in system fluid, for more precise temperature sensing, for lubrication, and to reduce oxidative deterioration of the bimetal.

The wall or keeper 3 is an integral part of the housing 4; the second bore 16 above bore 7 is coaxial with the bore 7, but it need not be. Secured to the outer end 17 of the magnetic element 2 by an annular skirt 18 is a cap 19, which extends over the exterior of the cylindrical projection 20 of the housing 4, closing off the bore 16 therewithin. The skirt 18 is swaged onto the cap. Within an annular recess 21 in the housing 4, surrounding projection 20, is a second bias means 22 which, in this embodiment, is a compression coil spring which extends from a recess in the inner face of the cap 19 within the flange 23 to the housing at the base of the recess 21, and urges the cap 19 and the magnetic element 2 to which it is attached away from the wall 3. This spring is selected so that it is retained in the stressed condition while the magnetic element 2 is held against the wall or keeper 3 by the attractive forces between the magnetic elements 1 and 2, or between element 2 and keeper 3; this attractive force between these elements is sufficient, so long as the adjacent poles of the magnetic elements 1 and 2 are separated by less than a predetermined distance, for example, one-sixteenth of an inch. Whenever the magnetic element 1 is moved away from the element 2 so that their adjacent poles are separated by more than one-sixteenth of an inch, however, the decreased force of magnetic attraction resulting therefrom is overcome by the force of the spring 22, and the cap 19 and element 2 are driven away from the wall 3.

In order to prevent the cap 19 and magnetic element 2 from being driven completely out of the bore 16 upon actuation, the open end of the annular recess 21 is closed off by an annular disc 26, retained there by a spiral lock washer 27, snugly held in the narrow groove 28 at the end of the recess 21. The inner periphery 29 of the disc annulus closely abuts, but does not touch, the cap 19. The flange 23 (which retains the spring 22) engages the disc 26 whenever the cap is thrust outwardly by the spring, thereby preventing the cap from proceeding further than the position shown in FIG. 2.

The transparent cover 45 provides protection for the cap 19 even when extended in the position shown in dashed lines in FIGS. 1 and 2, and permits its position to be noted. The enlarged periphery of the cover 45 is resiliently mounted in the annular recess 46 about the exterior of the housing 4, and protects the piston 2 while it is in the projecting position (not shown). The transparent cover 45 also protects the upper mechanism from intrusion of various solid contaminants and corrosive liquids.

The bimetallic element 30 at one end 31 is attached to the retaining ring 38, which is locked in the recess 40 at the open end of piston 5 by turning in the end walls 41. At the other end 32 the bimetallic element is turned to extend through the passage 34 in sleeve 5 and project into the groove 35 in piston 6, in the expanded position shown in FIG. 1 linking sleeve 5 and piston 6 so that they move together. The groove 35 has an upright side 35a and a ramp or slope 35b as the other side. This latter permits the tip of the bimetallic element to be forced out of the groove over the ramp after actuation, whenever the differential pressure across the piston diminishes to below the predetermined actuation pressure (e.g. on shut-down) and the piston 6 (with sleeve 5) returns to the nonactuated position, with the sleeve 5 locked in the actuated position by the detent spring 37, as discussed later.

The piston 6 at its central portion has a pressure-receiving surface 33, exposed to upstream fluid pressure at chamber 9, and a pressure-receiving surface 36 exposed to downstream fluid pressure in port (clearance gap) 39 past cap 13. When the pressure differential across piston 6 (i.e., between upstream and downstream, upstream fluid pressure being the higher), exceeds a predetermined minimum, the end of the bimetallic element moves outwardly, and with the bimetallic element 30 in the position shown in FIG. 1, sleeve 5 and piston 6 are linked, so the magnetic element 1 moves with the piston 6. With the bimetallic element 30 in the position shown in FIG. 2, sleeve 5 is no longer linked to piston 6.

In order to retain the sleeve 5 against movement, with the bimetallic element 30 in the position shown in FIG. 2, as well as to lock the sleeve 5 in an actuated position so as to prevent resetting of the indicating magnetic means 2 after actuation, a detent spring 37 is provided, anchored at one end to the bottom of the housing 4, and at the other end slidably engaging the exterior of the sleeve 5 in the space between the sleeve 5 and the piston 6 in a friction drag. The end of the spring 37 encircles the sleeve 5. The friction between the end of detent spring 37 and the sleeve 5 serves to keep the sleeve stationary when the piston 6 moves with the bimetallic element 30 in the decoupled position shown in FIG. 2, inasmuch as sleeve 5 is not exposed to differential fluid pressure.

With the sleeve 5 in the position shown in FIGS. 1 and 2, the upper end of the spring 37 slides over the smooth surface of the sleeve. Sufficiently above the end of the spring 37 is a groove 80, to give a reach before engaging the spring corresponding to the normal movement of the sleeve 5 with piston 6 when the two are linked together in response to the predetermined minimum differential pressure thereacross. Consequently, when the sleeve 5 moves with piston 6 away from wall 3 into the actuated position, triggering the indicating movement of the second indicating magnetic means 2, the end of the spring 37 enters the groove 80, and under the resilient spring action of the spring remains in the groove and retains the sleeve 5 against return to its normal position against wall 3. The indicating magnetic means 2 can now be reset only by removing the filter element or other component across which the differential pressure is being measured, exposing the end 41 of sleeve 5 so that it can be manually pushed axially. This resets the first magnetic means against wall 3, by overcoming the detent spring 37.

The bimetallic element 30 is preferably comprised of two arcuate inner and outer strip portions 42, 43, joined together, for example by a weld, and both arranged to bend inwardly with decreasing temperatures. At normal temperatures, element 30 has the radius shown in FIG. 1, and projects into recess 35. However, at temperatures below a preselected value, at which for example the fluid to be filtered increases appreciably in viscosity, for example, 33° F. to 62° F., the element 30 contracts so that the tip end 32 withdraws from the recess 35 into the passage 34, thus disengaging the piston 6, decoupling sleeve 5 and piston 6, and leaving sleeve 5 immobile, preventing actuation of the pressure indicator.

In operation, with the bimetallic element 30 in the position shown in FIG. 1, fluid pressure in the inlet line is communicated via the duct 12 to the space 9 of the cylindrical bore 7, urging the piston 6 and with it the magnetic element 1 and sleeve 5 away from wall 3 against the force of the spring 8 and the pressure from the outlet line, communicated to space 10 via port 39. Whenever the difference between the inlet and outlet pressures is greater than the force of the spring 8, the piston 6 and with it sleeve 5 are driven away from wall 3 in the bore 7. After the magnetic element 1 is moved to a position more than one-sixteenth of an inch away from the magnetic element 2, the attractive force therebetween is less than the force of the spring 22, and the magnetic element 2 is driven away from the wall 3 until the cap 19 (which if desired, may be of a suitable eye-catching color, such as red, orange or yellow) emerges through the aperture 34 into the actuated position readily observed through cover 45, and the flange 23 abuts the inside surface of the disc 26, where it is held firmly by the spring 22, in the position shown in FIG. 2.

The cap 19 in this position indicates that the pressure difference is greater than the predetermined value in accordance with which the spring 8 has been selected. As an example, the spring 8 may be arranged to permit the piston 6 and magnetic element 1 to be driven away from the wall 3 whenever the pressure difference exceeds 35 psi, and thus give a signal.

At temperatures below 32° F., for example, the thermostatic element 30 contracts, to withdraw the tip end 32 of the strip 30 from the recess 35, and decouple piston 6 and sleeve 5. Thus, when the piston 6 moves away from the wall 3 under a differential pressure exceeding the biasing force of spring 8, resulting from increased viscosity of the fluid, the sleeve 5, no longer coupled thereto, under the frictional drag imposed by detent spring 37, remains stationary, preventing a false indication of, for example, filter clogging.

If desired, this pressure indicator may be utilized to indicate a total pressure above atmospheric instead of a pressure differential, by communicating port 39 opening to space 10 to the atmosphere. Similarly, an absolute pressure may be indicated by connecting the port 39 and space 10 to a vacuum.

Whenever the sleeve 5 moves away from the wall 3 far enough to actuate the indicator 2, the detent spring 37 engages the sleeve 5 by entering the groove 80 on the sleeve. The sleeve 5 cannot then return close enough to wall 3 to attract the indicator 2. Thus, the spring 37 prevents resetting of the first magnetic means 1 without disassembly of the component across which the differential pressure is being measured so as to permit manual reset, by exceeding detent spring force to withdraw the spring 37 from the groove 80 in sleeve 5. After this is accomplished the cap 19 can be reset, and it will be retained in position by the magnetic force.

If this non-resetting feature is not desired, then the spring 37 can be present to provide frictional drag, but the groove 80 and the ramp 35b can be omitted. Then, in order to reset the cap 19 and piston 2 to the nonindicating position shown in FIG. 1, it is merely necessary to push in the cap. This is done by pushing on the cover 45, which is sufficiently flexible to permit this.

However, because of the fixed nature of the fluid flow connections to the inlet and outlet lines, the pressure indicator cannot be reset without closing down the system, such as would be done in a complete reservicing, at the time a filter element is replaced, so long as the unwarranted pressure differential continues, since then sleeve 5 remains away from wall 3, and the cap will merely pop right out again. As a practical matter, therefore, resetting cannot be accomplished while the fluid system is still in use, even without the detent shown in the drawing, which means that the indicator will continue to give an indication of the need for changing the filter element or other component until in fact the filter element or component has been changed.

The pressure indicator shown in FIG. 4 corresponds to an indicator of FIGS. 1 to 3, arranged to operate in the position shown. In this case, the piston and indicating magnetic element 52 are adapted not only to give a visual indication but also to actuate an electrical signal, which, by choice of the appropriate electrical circuits, in any conventional manner, can be adapted for example to shut off flow or to give a warning signal.

The indicator comprises a housing 50 with two magnetic elements 51 and 52, coaxially mounted on opposite sides of the wall or keeper 53. To provide an electrical signal upon actuation of the indicator, a switch 60 is mounted in a housing 61 which as shown is a part of the indicator housing 50, but need not be. Mounted on the switch is a lever 63 pivotally supported at 64 with one end 65 projecting into the annular recess 66 of the housing, defined about cylindrical projection 67, to a point abutting but not touching the cap 68, above the flange 69. Positioned above the lever arm 63, a switch actuator 70 in the form of a push button is movable by the lever arm 63 to actuate the switch 60 whenever the cap moves in the annular recess 66 so that flange 69 comes into contact with the end 65 of the lever arm 63, moving the arm 63 against push button 70. To provide a remote indication of the actuation of the indicator, suitable conductors 71 from the switch 60 are arranged in any conventional manner to complete appropriate electrical circuits whenever the switch is actuated.

In operation, with the bimetallic element 77 in the position shown in FIG. 4, a source of inlet or high pressure is connected through a duct (not shown) to the space 72 above the cylindrical piston 73, urging the piston 73 and with it the coupled magnetic element 51 and sleeve 57 away from wall 53 against the force of the spring 78, as in the device of FIGS. 1 to 3. The downstream side of the piston 73 can be connected to the outlet line (in which case the device acts in response to differential pressure) or to the atmosphere, or to a vacuum. Whenever the difference between the pressures on opposite sides of the piston 73 is greater than the force of the spring 78, the piston 73 and sleeve 57 are driven away from wall 53. Whenever the magnetic element 51 has been driven more than one-sixteenth of an inch from the wall 53, the indicator and switch will actuate. The magnetic element 52 and cap 68 will be driven by spring 74 away from the wall 53 until the flange 69 abuts the end 65 of the lever arm 63, thus moving the arm against the push button 70, and actuating the switch.

At the same time as the switch 60 is actuated, the cap 68 emerges from the housing, and also gives a visual signal of the actuation of the indicator.

If now the temperature drops below, for example, 32° F., the bimetallic element 77 contracts, and withdraws from recess 75 in piston 73, decoupling piston 73 and sleeve 57. Thereafter, sleeve 57 remains stationary when piston 73 moves, thus deactuating the indicator.

In the embodiments shown in the drawings, the magnetic elements 1 and 2 or 51 and 52 are arranged so as to attract each other, with opposed poles. An equivalent result can be obtained by arranging the element 1 and 2 or 51 and 52 so as to be mutually repelling with like poles facing each other. This requires only a small modification of the structure shown, that would be obvious to anyone skilled in this art with a knowledge of magnetic principles, using the principles of this invention as discussed above.

In the embodiment shown in FIGS. 1 to 4, the magnetic element 1 or 51 can be reversed, so that the south pole faces the south pole of magnetic element 2, or 52, and the element 1 or 51 relocated so that it is at the opposite end of the bore, in its normal position, with the spring 8 or 78 relocated to the opposite side of the piston, to bias it in the opposite direction. The pressure-sensing line connections 12 and 39 also have to be reversed, so that outlet line pressure is sensed via bore 12 and inlet line pressure sensed via port 39. Now, a pressure differential sensed by the piston 1 or 51 via bore 12 and port 39 tends to move the piston towards wall 3 or 53, repels magnetic element 2 or 52 away from wall 3 or 53, and eventually to an actuating position. In this type of embodiment of course elements 1 and 2 or 51 and 52 must both be magnets, unless wall 53 is a magnet of opposite polarity instead of element 2 or 52.

It will be understood that the devices shown are designed so that the higher pressure of the two pressures being sensed is communicated to the piston 1 or 51 via bore 12. When the magnetic elements are repelling, the higher pressure is communicated to the piston 1 or 51 via port (clearance gap) 39.

If desired, the magnetic pressure indicator can be provided with a loose nonmagnetic ball detent, as in U.S. Pat. No. 3,785,332 patented Jan. 15, 1974 to Bernard Silverwater, to prevent deactuation of the indicator should pressure return to normal, and/or with sampling ports, as in U.S. Pat. No. 4,026,153, patented May 31, 1977 to Bernard Silverwater.

Having regard to the foregoing disclosure, the following is claimed as the inventive and patentable embodiments thereof:

1. A magnetic pressure indicator which does not give a false signal due to increase in fluid viscosity at abnormally low temperatures, comprising, in combination, means movably responsive to changes in differential pressure above a predetermined minimum; a first reciprocable magnetic means not responsive to changes in differential pressure except when linked to the movable means, and spaced from and arranged to attract or repel a second indicating magnetic means or keeper so long as the two means or the first means and keeper are within their mutual magnetic fields of force; first bias means to retain the means responsive to changes in differential pressure thereacross towards or away from the second magnetic means or keeper; and normally biasing said means movably responsive to changes in differential pressure toward or away from the second magnetic means by a predetermined force; the second magnetic means being normally retained in a first position; and second bias means to propel the second magnetic means from the first position to an indicating position whenever the spacing distance between the two magnetic means is changed; the second magnetic means being normally biased by the bias means in a direction away from the first means by a force capable of overcoming the force of magnetic attraction for the first means or the keeper whenever the first and second magnetic means are spaced by a predetermined distance; a bimetallic means movable according to change in temperature between a position at a temperature above a predetermined minimum linking the means movably responsive to changes in differential pressure to the first magnetic means, so that when so linked the first magnetic means moves with the said means movably responsive to changes in pressure, and a position at a temperature below a predetermined minimum disengaging the said means movably responsive to changes in differential pressure and the first magnetic means, so that the latter remains stationary when the former moves, thereby failing to actuate the second indicating magnetic means at such temperatures, and avoid giving a false signal, while under no stress while in that disengaging position, thus forestalling damage thereto.

2. A magnetic pressure indicator according to claim 1, in which the coupling means and first magnetic means are in the form of concentric sleeves, and the bimetallic means is mounted within the inner concentric sleeve, and one end thereof extends through an aperture through a side wall of the inner sleeve, into and away from engagement with an aligned recess in the outer sleeve.

3. A magnetic pressure indicator according to claim 2 in which the interior of the inner sleeve has a port allowing entry of liquid and is adapted to operate liquid-full, bathing the bimetallic means in such liquid.

4. A magnetic pressure indicator according to claim 1, having a bimetallic means comprised of arcuate inner and outer strip portions of different metals or metal alloys having differing coefficients of thermal expansion joined together, and arranged to change degree of curvature and thus bend outwardly or inwardly with change in temperature, the bimetallic means having at operating temperatures a curvature at which it links the means responsive to changes in differential pressure and the first magnetic means, and at temperatures below a preselected minimum a curvature at which it decouples the said means and the first magnetic means.

5. A magnetic pressure indicator according to claim 1, in which the means responsive to changes in differential pressure is a piston having pressure-receiving surfaces facing outwardly towards each end of the piston.

6. A magnetic pressure indicator according to claim 1, in which at least one of the first and second bias means is a spring.

7. A magnetic pressure indicator according to claim 1, in which at least one of the first and second bias means is a magnet.

8. A magnetic pressure indicator according to claim 1, in which the second magnetic means is arranged so as to become visible after actuation.

9. A magnetic pressure indicator according to claim 1, having the second magnetic means arranged so as to actuate a switch.

10. A magnetic pressure indicator according to claim 1, in which both the first and second magnetic means are magnets.

11. A magnetic pressure indicator according to claim 1, in which one of the first and second magnetic means is a magnet, and one is of magnetizable material.

12. A magnetic pressure indicator according to claim 1, in which the first and second magnetic means are separated by a wall, both of the magnetic means are of magnetizable material, and the wall is a magnet.

13. A magnetic pressure indicator according to claim 1, in which one of the first and second magnetic means is a magnet and the wall is a magnet.

14. A magnetic pressure indicator according to claim 1, in which the first and second magnetic means are mutually attracting.

15. A magnetic pressure indicator according to claim 1, in which the first and second magnetic means are mutually repelling.

16. A magnetic pressure indicator according to claim 1, comprising a spring detent engaging and retaining the first reciprocable magnetic means in a position in which it does not attract or repel the second indicating means or keeper.

17. A magnetic pressure indicator according to claim 15, in which the spring detent engages a recess in the first reciprocable magnetic means.

18. A magnetic pressure indicator according to claim 1, comprising a spring detent engaging the first reciprocable magnetic means in a friction drag retaining the first reciprocable magnetic means in a stationary position when the means movable in response to changes in differential pressure moves and the bimetallic means is disengaged.

19. A magnetic pressure indicator in accordance with claim 1, in which the bimetallic means is attached to the piston responsive to differential pressure and engages the first magnetic means at temperatures above a predetermined minimum, and disengages the first magnetic means at temperatures below the predetermined temperature.

* * * * *